United States Patent [19]

Brearley et al.

[11] Patent Number: 5,050,938
[45] Date of Patent: Sep. 24, 1991

[54] TRAILER BRAKING IN ELECTRONICALLY CONTROLLED BRAKING SYSTEMS

[75] Inventors: Malcolm Brearley, Solihull; Richard B. Moseley, Leamington Spa, both of England

[73] Assignee: Lucas Industries public limited company, Birmingham, England

[21] Appl. No.: 437,821

[22] Filed: Nov. 17, 1989

[30] Foreign Application Priority Data

Nov. 19, 1988 [GB] United Kingdom ............... 8827103

[51] Int. Cl.$^5$ ........................................... B60T 13/68
[52] U.S. Cl. ........................................ 303/7; 303/3; 303/20
[58] Field of Search ............... 303/7, 3, 20, 17, 29, 303/15; 188/112 A, 112 R

[56] References Cited

U.S. PATENT DOCUMENTS

| | | | |
|---|---|---|---|
| 3,909,075 | 9/1975 | Pittet, Jr. et al. | 303/20 X |
| 3,967,863 | 7/1976 | Tomecek et al. | 303/20 |
| 4,084,859 | 4/1978 | Bull et al. | 303/7 |
| 4,210,368 | 7/1980 | Sontheimer | 303/3 |
| 4,586,584 | 5/1986 | Auman et al. | 303/3 |

FOREIGN PATENT DOCUMENTS 0205277 12/1986 European Pat. Off. .
WO8705571 9/1987 European Pat. Off. .

Primary Examiner—Matthew C. Graham
Attorney, Agent, or Firm—Scrivener and Clarke

[57] ABSTRACT

An electronic braking system (EBS) for a towing vehicle which provides for trailer service brake pressure supply via an additional EBS sub-system, and wherein, in order to speed up the application of trailer braking, the electrical signal representing the driver's braking demand is processed to generate an additional pressure pre-pulse of predetermined amplitude to pressurise the trailer braking circuit in advance of the proportional pressure setting determined by the driver. The pre-pulse is made up of two parts, a preset fixed duration pulse followed without break by a variable duration continuation pulse. The variable duration of the variable duration pulse is determined primarily by the rate of increase of the driver's demand signal.

7 Claims, 10 Drawing Sheets

TRAILER BRAKING IN ELECTRONICALLY CONTROLLED BRAKING SYSTEMS

BRAKING SYSTEMS

The present invention relates to electronically controlled braking systems for motor vehicles and is particularly concerned with the braking of trailers being towed by vehicles equipped with such EBS systems.

In a vehicle arranged for towing a trailer where the towing vehicle is equipped with an electronically controlled braking system of the type substantially as described in our European Patent No. 205277, wherein the driver's braking requirement is produced from a special foot pedal as an electrical signal, and electronic control means are provided for generating fast response application pressures in the towing vehicle brakes, it is well known that some means is required to speed up the brake application pressures in the trailer brakes in order that the trailer does not overrun and push the already braking towing vehicle leading to an unstable condition in the combination. This situation is complicated by the practical fact that the towing vehicle equipped with an electronically controlled braking system may have to operate with one of the large number of currently available trailers which is not similarly equipped and therefore has slower air signalled braking requests. A number of means are known whose purpose is to achieve this objective but none operate sufficiently efficiently in order to signal the trailer brakes effectively as soon as the brakes are demanded by the driver.

It is an object of the present invention to achieve the maximum reduction in the delay before trailer braking becomes effective, particularly in the cases where changes to the existing braking system are restricted to the braking system of the towing vehicle.

In accordance with the present invention, there is provided an electronic braking system (EBS) for a towing vehicle which provides for trailer service brake pressure supply via an additional EBS sub-system in which, to speed up the application of trailer braking, the electrical signal representing the driver's braking demand is processed to generate an additional pressure inshot or pre-pulse of predetermined amplitude to pressurise the trailer braking circuit in advance of the proportional pressure setting determined by the driver.

Preferably, this pre-pulse is made up of two parts, a preset fixed duration pulse followed without break by a variable duration continuation pulse, the variable duration of which is determined primarily by the rate of increase of the driver's demand signal.

Advantageously, the variable width pulse duration, whilst set primarily by the rate of increase of the demand signal, is caused to be terminated before the end of the predicted period in the event that the prevailing rate of demand increase shows a substantial fall.

Preferably, the amplitude of the pre-pulse and the follow-on variable pulse are preset before a braking phase is demanded by the driver, based on an assessed and stored figure for the trailer mass such that a fully loaded trailer receives a maximum amplitude pulse and an unladen trailer receives a reduced amplitude speed-up pulse.

The invention is described further hereinafter, by way of example only, with reference to the accompanying drawings, wherein.

Figure 6:
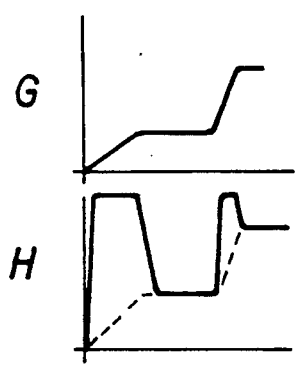
Figure 10:
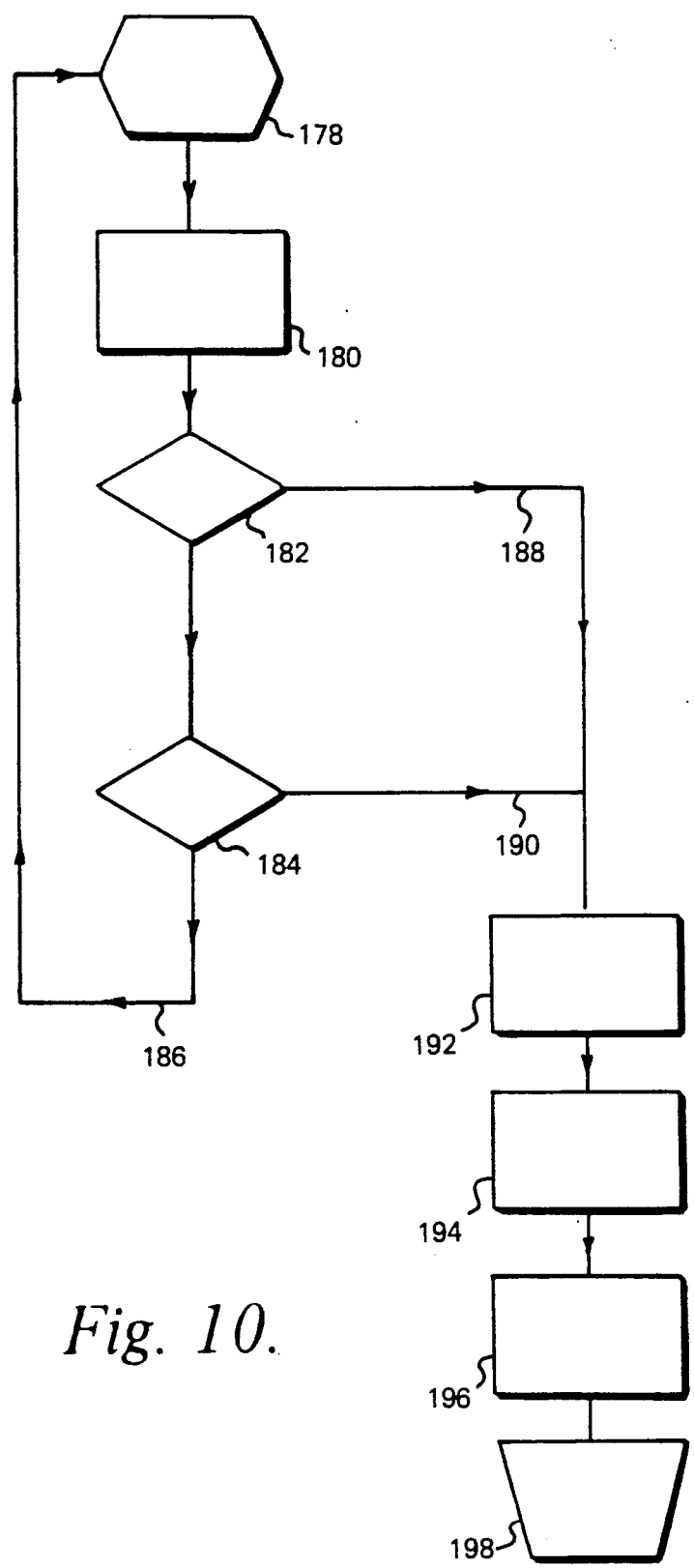
Figure 11:
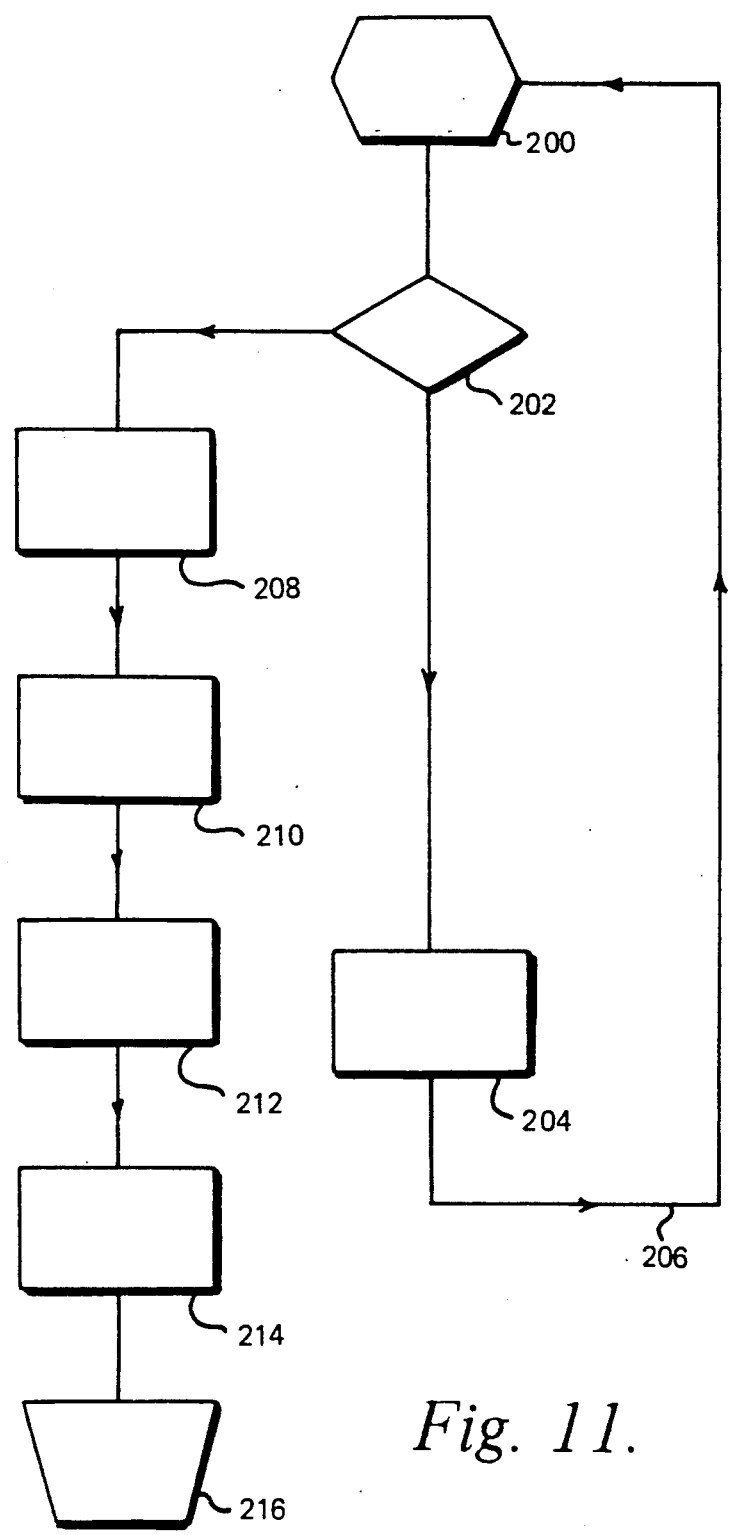
Figure 12:
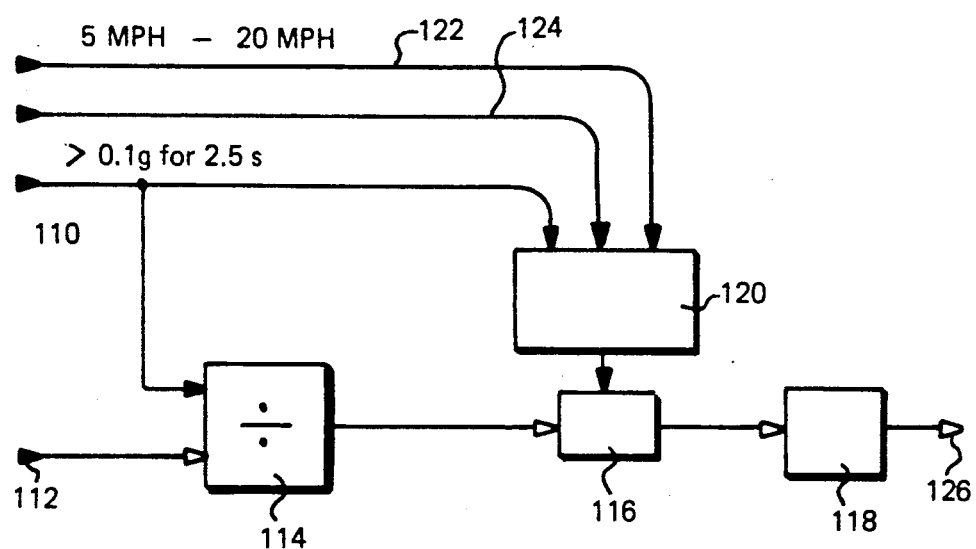

FIGS. 5a, 5b, 5c, 5d, and 5e are operating curves illustrating five different possible applications of braking and the braking demand which is applied as a pressure signal by the trailer braking valve to the trailer service braking line;

FIG. 6 illustrates a further example of driver's and trailer demand signals for a situation where a steady lower braking level is followed by a sudden brake increase;

FIGS. 7, 8, 9, 10 and 11 are flow diagrams illustrating the manner by which the pre-pulse and vari-pulse are established in typical cases; and FIG. 12 is a schematic diagram of a trailer mass detector which may be used in the present system.

Figure 1:
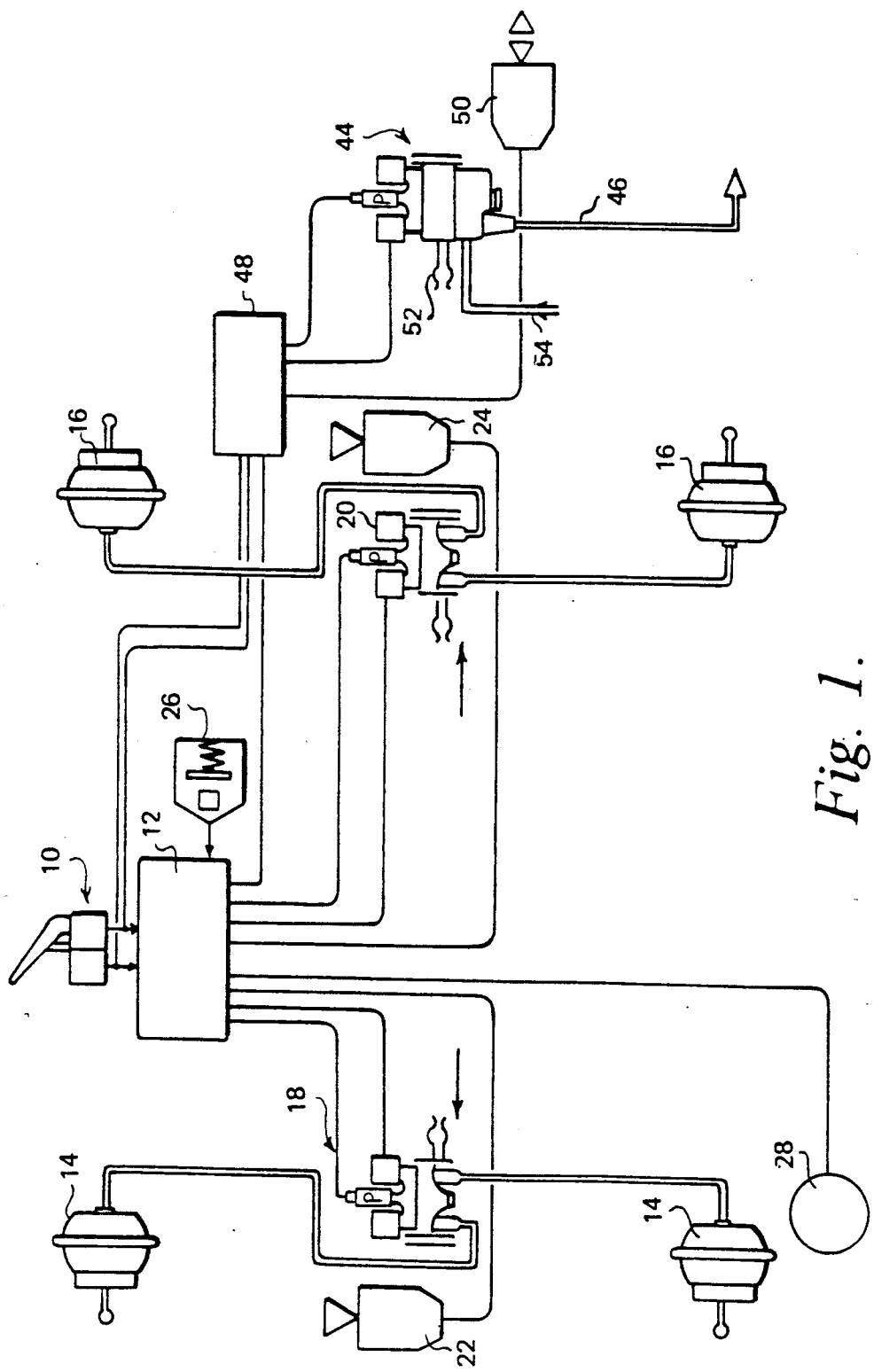
FIG. 1 is a schematic view of one embodiment of a vehicle braking system adapted to be fitted with an axle controlled EBS system in accordance with the present invention for controlling the braking signals supplied pneumatically to a standard trailer (not shown)

FIG. 1 illustrates, inter alia, the main components of a conventional electronic braking system (EBS) which is not described in detail herein. Driver's braking demand signals are generated electrically by a treadle-operated transducer arrangement 10 and supplied to an electronic controller 12 where front and rear braking pressures are established and fed to front and rear brake actuators 14,16 via respective relay valves 18,20. The braking pressures depend upon operating parameters of the vehicle determined, inter alia, by front and rear load sensors 22,24, a vehicle decelerometer 26 and a speed sensor 28.

It is known from our prior European Application No. 205277 (to which reference is hereby directed) that improved braking characteristics can be obtained in the electronic braking system of a motor-driven vehicle by incorporating means for modifying braking performance to take account of dynamic operating factors, such as vehicle load and road gradient. In this known system, vehicle load measurements, made dynamically, are used to modify the braking demand, individually for each axle of the vehicle and, under predetermined conditions of vehicle speed, braking level and operating gradient, the deceleration error formed between braking demand by the driver and measured actual vehicle deceleration is used gradually, over a number of vehicle stops, to form an adaptive factor for correcting the braking demand in order to restore expected braking performance. No correction to the adaptive factor based on the deceleration error is made during a given stopping operation of the vehicle, but a summation of previous errors is arranged to cause a small increment in correction to be made after each stop until, over a number of vehicle stops, the error formed under the predetermined conditions falls to zero.

A motor-driven vehicle having a braking system which operates in accordance with the aforegoing principles is described hereinafter as having "adaptive" braking.

In an adaptive braking system, the foot pedal transducer 10 generates a first signal indicating the braking level desired by the driver and additional sensors measure the vehicle axle loads (sensors 22,24 in FIG. 1) and the operating gradient. The system makes appropriate open loop corrections to the brake pressure demands being interpreted from the driver pedal input, with the aim of restoring the vehicle deceleration to be fixed in proportion to the driver's demand.

Figure 2:
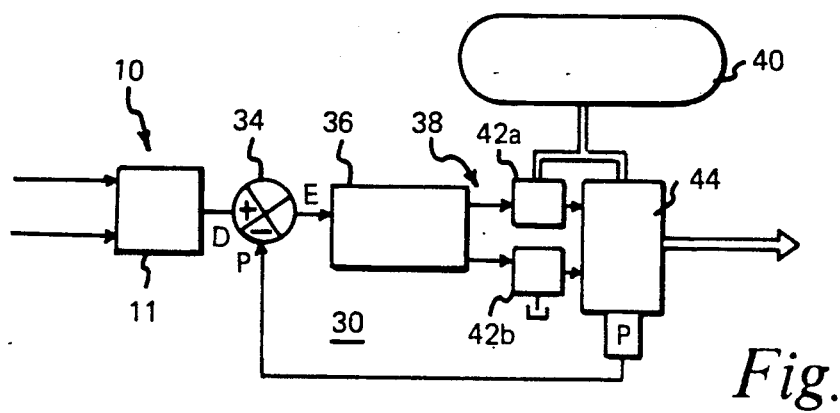
FIG. 2 is a schematic view of one embodiment of a basic pressure control loop used in the system of FIG. 1.

Referring now to FIG. 2, there is shown a known system which employs a pressure control loop 30 taking an input D, via a "select highest" element 11, from a duplex brake pedal transducer 10 which is used to provide a pressure error signal E by comparison in an adder/subtractor 34 with a pressure transducer output signal P, this pressure error E forming the input to a pressure controller 36 which generates an output signal which causes the pressure developed by an electropneumatic or electro-hydraulic converter 38 to change in a direction such as to reduce the amplitude of the pressure error E. Pneumatic or hydraulic pressure medium is stored in a reservoir 40.

The nature and circuit of such a pressure controller 36 depends upon the type of converter 38 employed. Two such converter principles are well known, namely an analogue system in which a valve is employed with pressure output developed proportional to solenoid current and a digital system, as shown in FIG. 2, in which a pair of simpler solenoid valves 42a, 42b is employed to raise or lower a control chamber pressure by selective energisation. One form of pneumatic converter employs a relay valve 44 which responds to this control chamber pressure and which re-balances into the closed condition when the brake pressures at the brake actuators 14,16 of the vehicle become equal to this control pressure. Such a valve 44 has an advantage in that the control chamber pressure responds rapidly to valve opening, giving a fast control loop which is accurate and responsive. An example of such a relay valve is that described in our U.K. patent application No. 8905312, to which reference is hereby directed.

As explained in more detail in our aforementioned European Application No. 205277, adaptation of the braking performance takes place after every significant stop (or reasonable deceleration level). Achieved deceleration is compared in an adaptive loop with the deceleration level demanded by the driver via the foot pedal 10. As indicated schematically in FIG. 3 of the present drawings, the resulting deceleration error $F_E$, calculated from the difference, is integrated throughout the stop. At the end of the stop, the average error is formed and the figure for this average error is then integrated into an adaptive constant which is gradually built up over a series of stops. In some vehicle systems, this adaptive constant may be expanded into an adaptive array of constants based on speed and deceleration where braking relationships are significantly non-linear. The adaptive constant (or array of constants) is reduced to a suitable fraction of the integrated value or values and is applied into a system scaling multiplier (described more fully in European 205277) where it modifies the relationship between compensated driver's demand and corresponding towing vehicle braking pressure demand.

Figure 3:
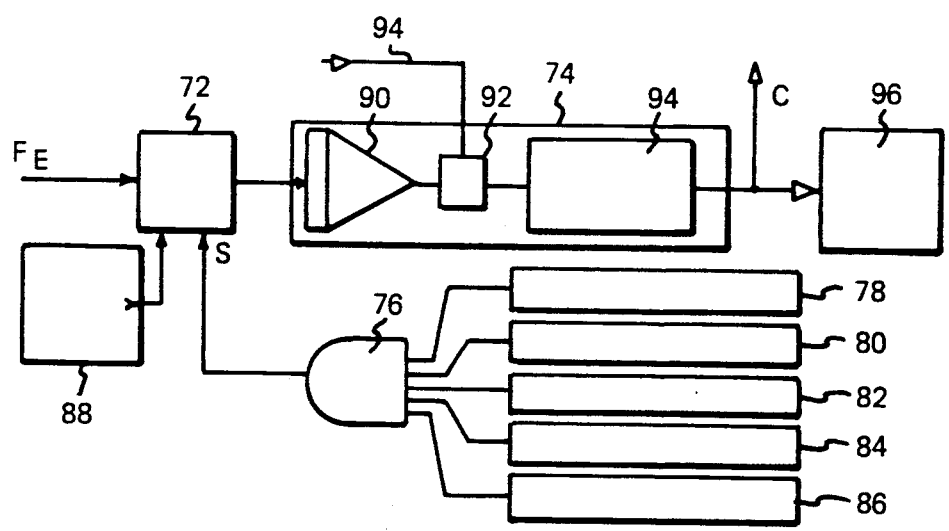
FIG. 3 is a schematic view of one embodiment of a basic adaptive brake control loop used in the system of FIG. 1.

Referring to FIG. 3, a controllable switch 72 is adapted to permit the passage of the deceleration error $F_E$ to a long term adaptive constant calculating means 74 only when a control signal S from a gate 76 indicates the receipt of signals from a sensor 78 responsive to the demand being greater than a first predetermined level, a sensor 80 responsive to the gradient being in a zero band, a sensor 82 responsive to the speed being greater than a first predetermined threshold, a sensor 84 responsive to the demand being less than a second predetermined level and a sensor 86 responsive to the vehicle speed being less than a second predetermined threshold. In the absence of the signals, the switch 72 inhibits the deceleration error $F_E$ from reaching the circuit 74. The switch 72 also inhibits the deceleration error on receipt of a signal from an anti-lock (ABS) detection means 88.

The long-term adaptive constant producing means 74 includes a very slow integrating means 90 whose output is connected via a switch 92 to a sample averaging means 94, the switch 92 being controlled in response to an End of STOP Pulse provided on a line 94 at the end of each vehicle stop. It should be pointed out, however, that the block diagrams showing the long term adaptive constant being derived from decleration error are an attempt to illustrate in simple terms what in practice would be achieved with software.

By way of example, the integrator 90 of FIG. 3 can be simulated by a digital computer using an accumulating memory location which receives the addition of processed deceleration errors at regular preset intervals. The integrator can be reset at any point in time, to a preset starting point such as unity, or a scaled value representing unity. The integral correction developed at the end of any stop (or at the low speed point at which the correction changes are discontinued) can be determined by calculation of the difference between the integrator final reading and the stored integrator start figure.

Thus at the end of each stop, the integrating location can be reset to the stored integral start figure. This may be a preset base figure or may alternatively be a progressive figure formed from the previous integral start level plus a percentage of the integral correction developed during the stop. If this is the case, the store integrator start figure is changed after each stop and control is thereby adapted to suit braking conditions.

An accumulation of similarly derived figures on each stop is formed and is processed in the very slow integrating means 90 to generate the adaptive constant C, assessed over a sizeable series of vehicle stops. This adaptive constant has a nominal or start value of unity and is gradually modified to correct changing brake conditions between stops. This constant is therefore a good indicative of brake condition and is regularly updated within the controller and stored in electrically alterable non-volatile computer memory to provide, at start up or on demand, a brake performance factor via a diagnostic output port 96.

When a vehicle equipped with such an electronic brake control system (EBS) is adapted for towing a standard trailer, i.e. one not so equipped with its own EBS system, then the brake demand signalling to the trailer is in the form of a pneumatic pressure signal which is provided by the EBS system on the towing vehicle. For this purpose, in addition to the basic components mentioned above, the present system also includes a sub-system comprising a separate relay valve 44 (FIG. 1) for supplying a pneumatic signal to the trailer brakes (not shown) via a trailer service air supply pipe 46 under the control of a trailer brake controller unit 48. The trailer brake demand pressure is adjusted to suit the trailer load as assessed on the towing vehicle by processing the signal from a load sensor 50 and to compensate for the operating gradient which is measured by the EBS system. The load sensor 50 is disposed in the coupling link (not shown) between the towing vehicle and the trailing vehicle and can be of the same general type as used in EP 301018. In addition to the trailer brake being applied when there is a driver's foot demand signal generated in either of the towing vehicle braking circuits if there is more than one, generation of a trailer brake signal will also occur when the parking brake of the towing vehicle is applied.

The braking circuitry of an axle-controlled EBS vehicle shown in FIG. 1 is thus provided with an extension to its pneumatic circuit and to its electronic control system in order to provide a suitable trailer brake control channel compatible with current trailer systems. The conventional truck EBS, for example, is a split system having regard to both its pneumatic circuits and to its electronic control provisions in order to comply with existing safety standards. The brake pedal transducers, the controller and power supplies are duplex and the pneumatic circuits are separate and individual for each axle. These principles are continued when the trailer supply subsystem is added in that the control valve 44 for the trailer supply is fed via pipework 52 from its own trailer supply reservoir (not shown), the latter valve 44 having either an integrated or a separate control element which accepts the inverse air parking brake signal via a line 54 to convert this to a trailer brake signal in the line 46. This trailer brake control system is fed with signals direct from each of the two (duplex) brake pedal transducers, in parallel with the feeds to each axle control channel and the whole trailer braking circuit is fed with battery power from both main and auxiliary batteries in order that this sub-system will maintain operational control in the event of either axle system failing.

Like the main braking system described above, the sub-system for the trailer brakes is also subjected to adaptive compensation. Thus, the trailer channel controller 48, which sets the trailer braking pressure in line 46 from the driver's braking demand, is compensated for operating gradient and is optionally compensated for trailer load being carried and for the operating gradient of the vehicle/trailer combination (as sensed at the towing vehicle).

Figure 4:
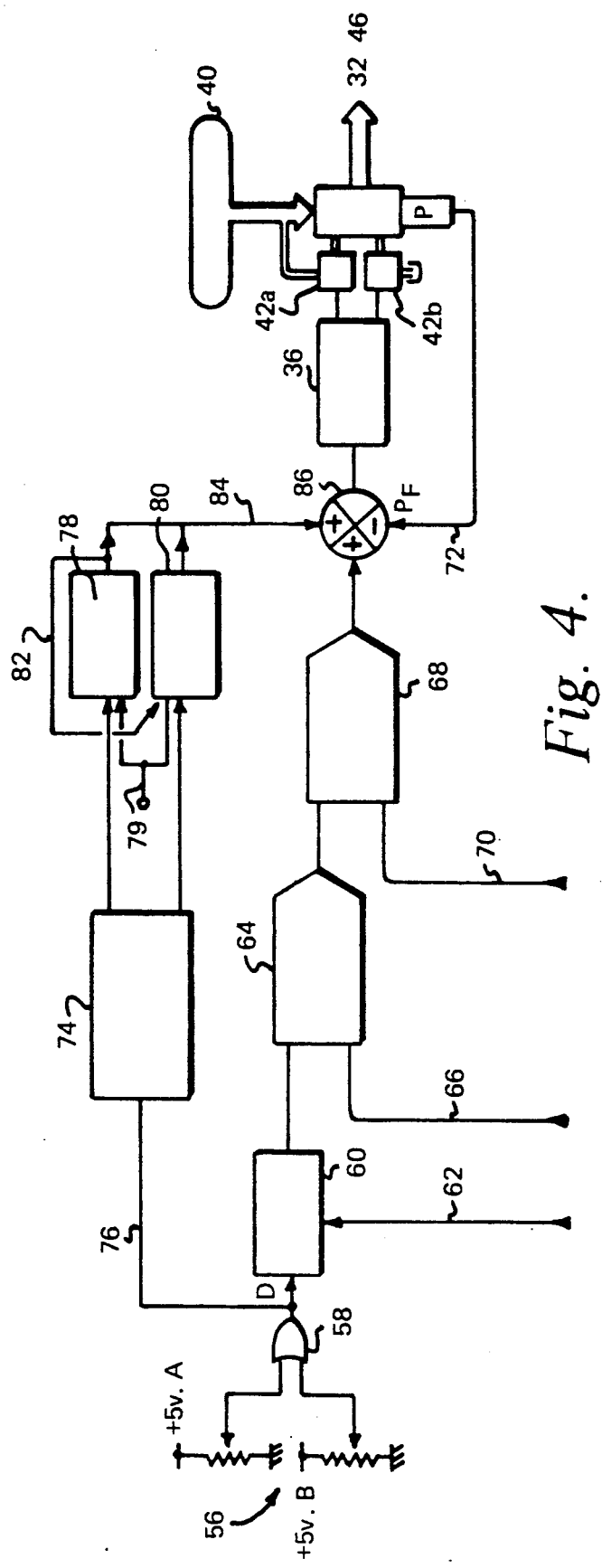
FIG. 4 is a schematic view of one embodiment of a trailer braking controller used in the system of FIG. 1.

The trailer channel controller 48 is illustrated in more detail in FIG. 4. Driver's input from a duplex pedal assembly 56 produces a driver's demand signal D by way of an OR gate 58. The demand signal D is first compensated for operating gradient in a gradient compensation element 60 which receives an input signal from the towing vehicle system on line 62 representative of the prevailing road gradient. The compensated demand signal is then modified for trailer mass which is either measured (see FIG. 12 discussed hereinafter) or assumed to be full load. The assumption for full load is to take account of the trailer being fitted already with a pneumatic load-conscious valve(s). In the latter case, a full load value air signal would be sent to the trailer which would then be controlled by the fitted apportioning valve. Modification for trailer mass is achieved in a load multiplier 64 which receives as one input, on a line 66, a signal representative of trailer mass or assumed full load value. The gradient-compensated and load-multiplied demand signal is then passed on to a "scaling multiplier" 68 whose function is to introduce, via a line 70, either a trailer adaptive variable or an array of such variables, based upon the trailer coupling load (see our copending U.K. Application No. 8827101). The scaled signal is then operated on by a pressure feedback signal $P_F$ on a line 72 to produce an operating signal for the pressure controller 36 (see FIG. 2). The output of the pressure control loop 30, controlled by the pressure controller 36, provides the pneumatic signal for the trailer brakes in conduit 46.

Thus, the trailer channel controller 48 sets the trailer braking pressure in line 46 from the driver's braking demand, optionally being compensated for trailer load being carried and for the operating gradient of the vehicle/trailer combination (as sensed at the towing vehicle).

The sub-system containing the trailer control channel is also characterised by having the facility to respond, through electrical signalling, substantially at the instant that the vehicle brakes are demanded and before the towing vehicle brakes are actually applied. To achieve this, the sub-system response is arranged to be such as to provide a pulse inshot of pressure into the trailer brake circuit and the interconnecting line 46 between the towing vehicle and the trailer. This pressure inshot or pre-pulse is provided by an electro-pneumatic control valve which generates a preset high level of pressure into the service brake line 46 to pressurise the trailer brake circuit in the shortest possible time, limited only by piping restrictions.

The inshot pulse is of preset amplitude, which may, for example, be the maximum pressure of the towing vehicle air reservoir 40, and is of variable duration comprising two pulses which are contiguous. The first pulse is a fixed duration initial pulse designed to admit the first wave of pressurisation air into the trailer circuit and does not depend upon the characteristics of the driver's braking demand. The second pulse is of the same amplitude as the first with a duration which is set by the rate of change of the braking demand signal produced by the foot pedal transducer 10. The second pulse duration is set by the derived rate of change of demand signal in such a way that if this rate of change falls, for whatever reason, the pulse can be terminated if at any point the current predicted duration becomes equal to the current timed duration of the second pulse.

Where a means of assessing the trailer mass is available (see the discussion of FIG. 12 hereinafter), this factor can be used to adjust the amplitude of the pre-pulse so that pressure pulses are at maximum pressure when the trailer is fully laden and at reduced pressure when the trailer is unladen.

Figure 5:
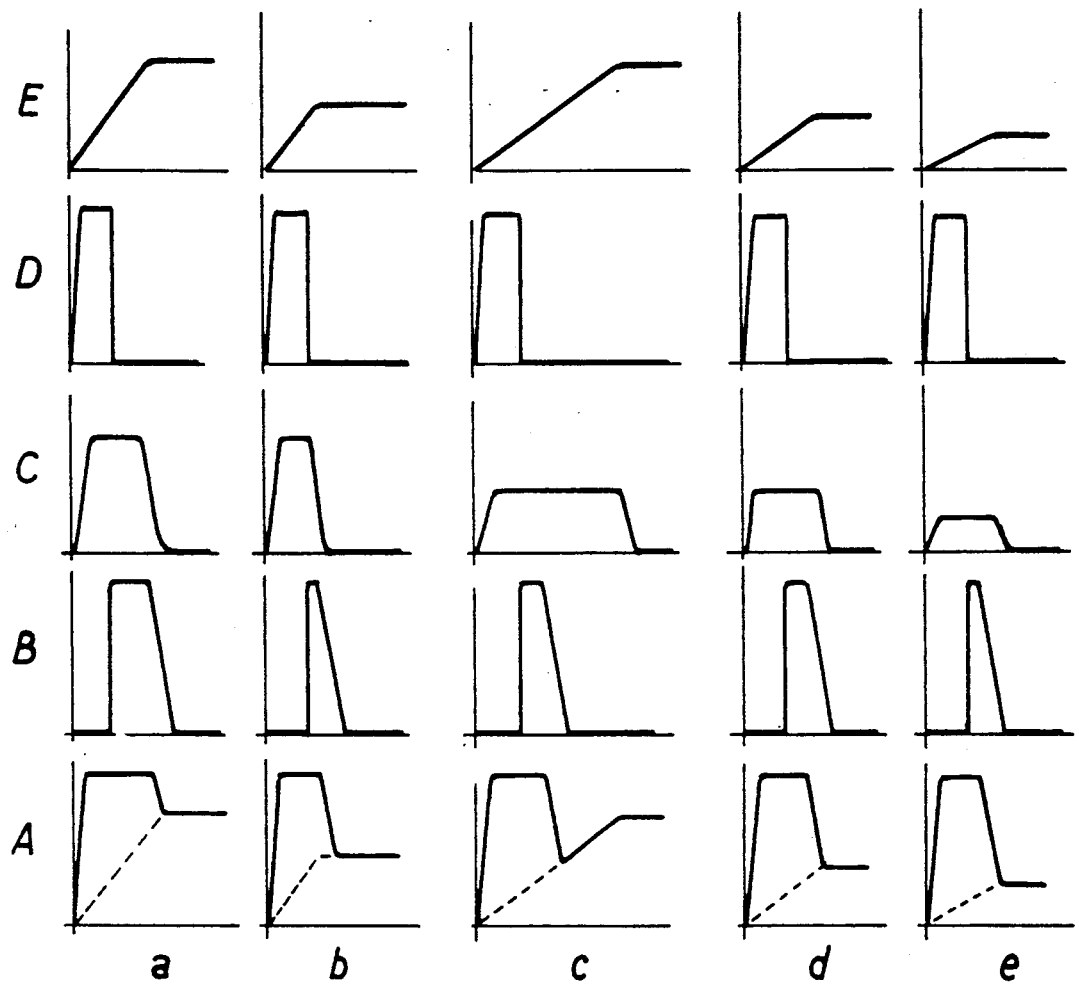

FIG. 5 of the accompanying drawings shows five examples of possible applications of braking and the braking demand which is applied as a pressure signal by the trailer braking valve to the trailer service braking line 46. In all cases, a fixed duration, pre-set height, pre-pulse is applied to the trailer system each time a new brake application is detected. For very short or very light brake applications this can be the only pulse generated. The waveforms shown in FIG. 5, however, all assume more significant brake applications. In FIG. 5 the top horizontal row A shows "DRIVER'S BRAKE DEMAND", row B shows the resulting "PRE-PULSE", row C shows the rate of change of driver's demand $$\frac{d\,(\text{DEMAND})}{dt},$$

row D shows the corresponding "VARI-PULSE", and row E shows the resulting "TRAILER-DEMAND".

A pre-pulse alone is arranged to pulse pressurise the trailer feed and piping 46 prior to receipt of the small brake demand signal which follows, and the amplitude and duration are chosen to suit the towing vehicle/trailer combination.

FIG. 5a shows an emergency brake application characterised by rapid build up of the driver's brake demand to a high braking level. This means that the rate of change of demand is high and protracted and this causes a relatively wide variable pulse to be added to the pre-pulse. In FIG. 5a, the rate of change of demand falls when the maximum braking demand is reached and this causes the vari-pulse to be terminated shortly thereafter.

In FIG. 5b, a similar fast demand is applied but for a shorter period, as the final application level is considerably less than maximum. The high rate of change of demand predicts a wide vari-pulse, but this is terminated as the demand levels off.

In FIG. 5c a more gradual, full brake application is made and the rate of demand increase is low. This predicts a short vari-pulse which is allowed to continue until the predicted period expires as the build up continues for considerably longer than this period. The trailer demand of FIG. 5c shows a pre-pulse plus vari-pulse combination then falls to the steady build up condition. This pressurises the trailer air system and advances the brake application but because the demand build up rate is low the large demand to the trailer is not maintained, as this would leave a trailer over-braking condition.

FIG. 5d shows a similar build up of brake demand to FIG. 5c but to only half of the final demand of FIG. 5c. This predicts a vari-pulse as in FIG. 5c but the rate of demand increase falls before it is complete, terminating the pulse once the steady braking level has been reached.

In FIG. 5e a slow and small brake demand causes the pre-pulse to be followed by a very short vari-pulse resulting from a small rate of demand increase and the trailer demand falls to the steady state level.

Referring again now to FIG. 4, the additional components needed to achieve the establishment of the pre-pulse are described. The driver's demand signal D, upstream of the Gradient compensation element 60, is passed to a circuit block 74 via a line 76. In the circuit block 74, the driver's demand is detected and a measure is made of the rate of change of the demand. The rate of change output is fed to two control stages 78,80. One of these stages, the "pre-pulse" stage 78, acts at the initiation of driver's demand. The output of the pre-pulse stage 78 serves to trigger the second "continuation, vari-pulse" stage 80 via a line 82. The output of these stages 78,80 is then added to the compensated and multiplied demand control signal via a line 84 and adder element 86 In addition, the "trailer mass" signal (see FIG. 12 and its description) can be fed to both the "pre-pulse" and "vari-pulse" stages via input lines 79 to act as a modifier for the magnitude and duration of the combined output signal.

Trailer mass can be calculated using the detector shown in FIG. 12. A vehicle acceleration signal on a line 110 and a trailer coupling tensile load signal on a line 112 are divided in a divider 114 and the result passed, via a switch 116, to a mass store 118. The switch 116 is only opened by a selector 120 on receipt of (a) a vehicle speed signal on a line 122 showing that the vehicle speed lies between typically 5 mph–20 mph, (b) a zero gradient signal on a line 124 indicative of the road gradient being substantially zero, and (c) a vehicle acceleration signal on line 110 showing that the acceleration has been for example >0.1 g for at least 2.5 seconds. A signal representative of trailer mass is output on line 126.

Whereas FIGS. 5a–e show steady increase of brake demand, realistic demands can, of course, have any shape. The present system is capable of providing good trailer brake demands under these conditions as the rate of demand increase is measured continuously with the predicted vari-pulse width being stored at the end of the pre-pulse, from the measurement of brake demand increase at that point. Falling demand increase rate is detected and if the expired vari-pulse is longer than that which would be predicted by the current rate of change of demand measurement, the pulse is terminated.

If during a brake application, after the vari-pulse has been ended for a preset period, a sudden brake demand increase which has a rate of demand increase greater than a preset significant level, a second vari-pulse can be produced with a width predicted by the measured increase rate and with similar termination if the increase rate falls noticeably during the period of the pulse. This is illustrated in FIG. 6 where a sudden brake increase after a steady lower braking level has been applied for some time, causes a second vari-pulse which is terminated by brake demand increase falling off. In FIG. 6, the upper curve G is representative of "DRIVER'S DEMAND" and the lower curve H shows the resulting "TRAILER DEMAND" generated.

For the purpose of more fully illustrating the manner in which the trailer pre-pulse can be generated by the system, reference is now made to the flow diagrams of FIGS. 7 to 11.

The generation of the trailer brake pre-pulse is achieved in the following manner.

Eight phases are used for the areas of control required. These are:

1) Zero driver demand . . . pulse discontinued.
2) Fixed duration pre-pulse
3) Driver demand non-zero (first sample after pre-pulse)
4) Pulse active, continuing pulse
5) Pulse active, demand rate below threshold value, (pulse is terminated)
6) Pulse active, timer timed out, (pulse is terminated)
7) Pulse inactive, normal brake pressure generated.
8) Pulse inactive, Demand rate above threshold, (additional vari-pulse generated).

Figure 7:
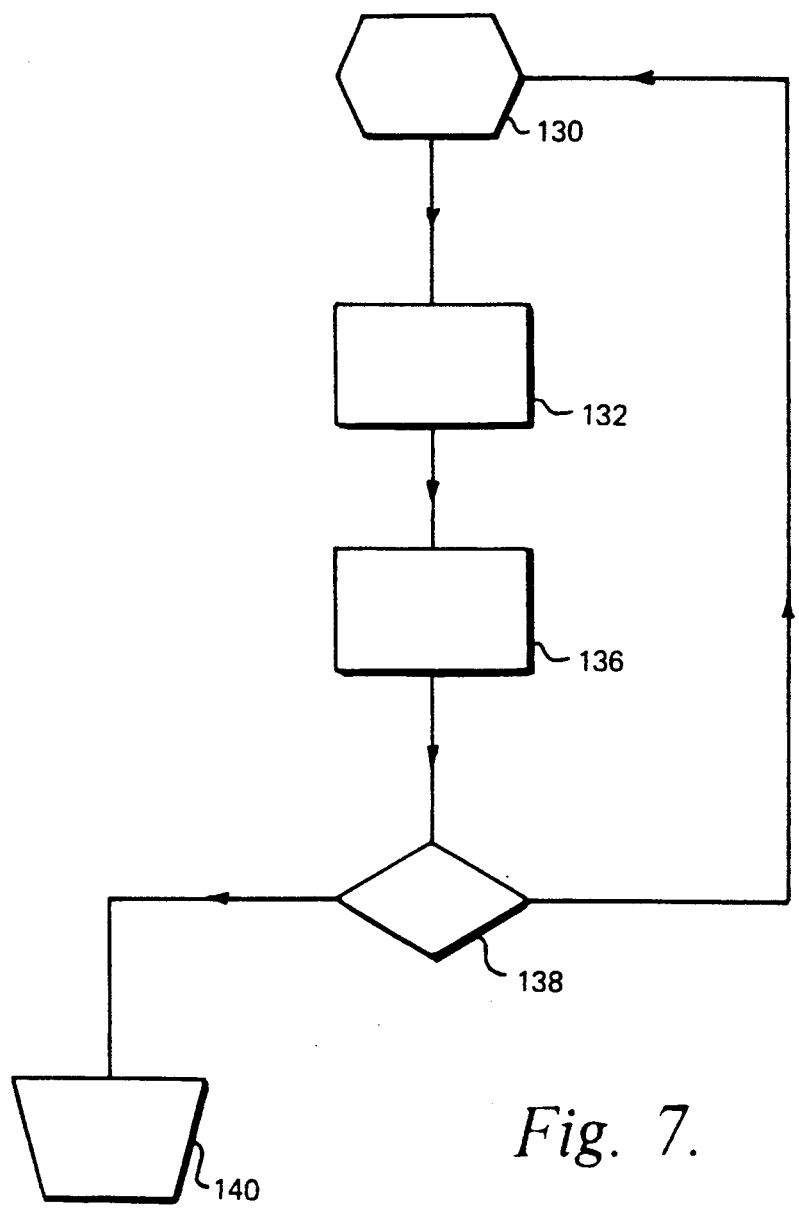
Figure 8:
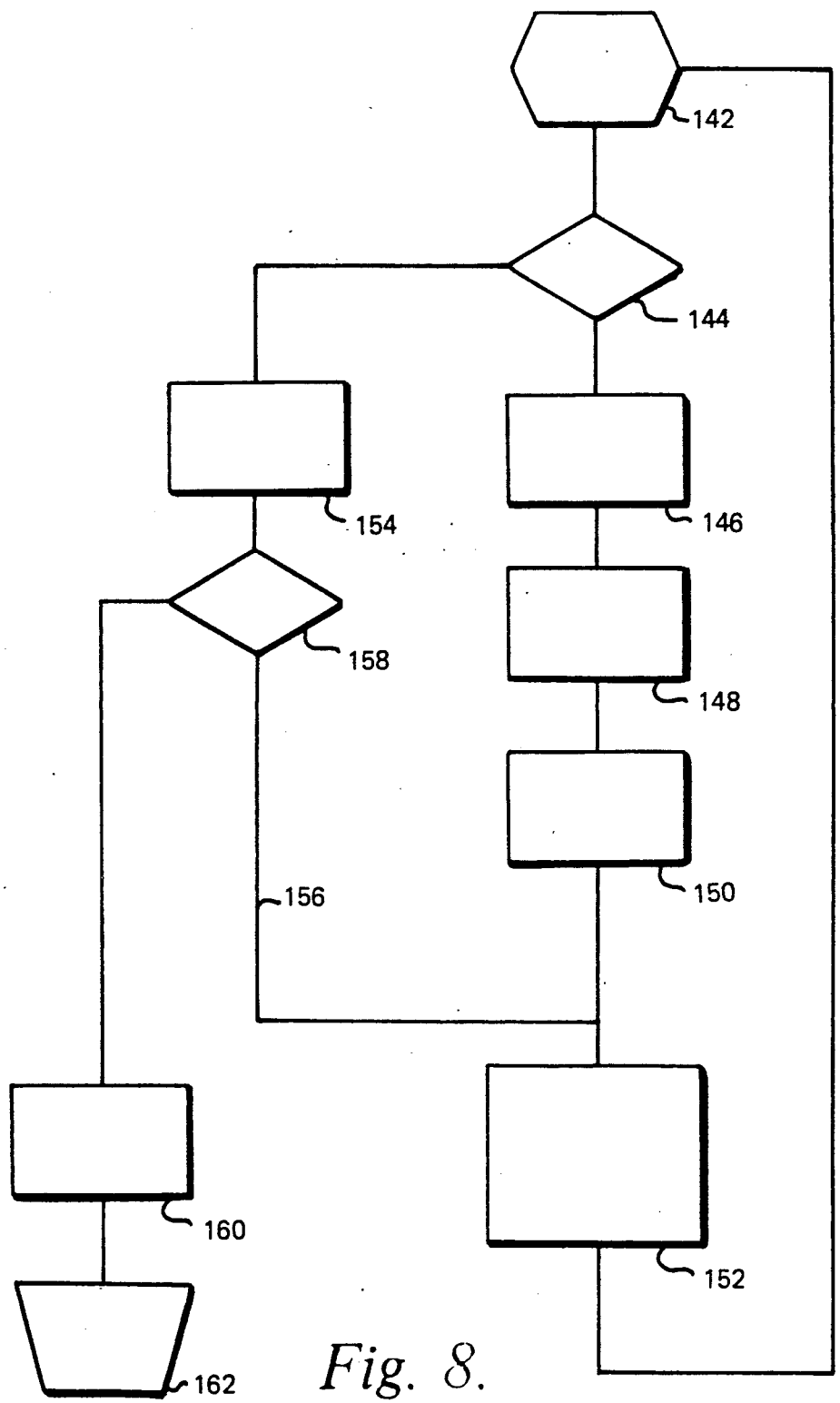

Referring to FIG. 7, normal control starts with phase I (block 130) when the driver's demand is zero. The output pressure is set to zero (block 132), a "pulse active" flag is cleared (block 136). If the driver's demand remains at zero then the program is returned to phase 1 (block 130) via block 138. However, when a non-zero driver demand is registered, control is passed to phase 2 by block 138 and block 140.

In phase 2 (FIG. 8), the initial fixed duration pre-pulse is generated. Phase 2 begins at block 142. If a "pulse-active" flag has not been set (block 144) then the pulse amplitude is calculated at block 146 using the trailer mass (see FIG. 12). A pulse timer is then set up (block 148) for the fixed duration pulse and the "pulse-active" flag is set (block 150). The rate of change of demand is calculated (block 152) for use in generation of the vari-pulse and the program returns to block 142. If it is detected at block 144 that the "pulse-active" flag has been set, then the pulse timer is decremented at block 154. When the timer has not yet timed out (block 158), the program returns to block 152 via path 156. If the timer has timed out, then the "pulse-active" flag is cleared (block 160) and control is passed via block 162 to phase 3 (FIG. 9) for the initialisation of vari-pulse phases.

Thus, when the pre-pulse is complete, control is passed to phase 3 where the vari-pulse is initialised, the pulse timer is set to a time determined from the rate of change of demand and the "pulse-active" flag set.

Figure 9:
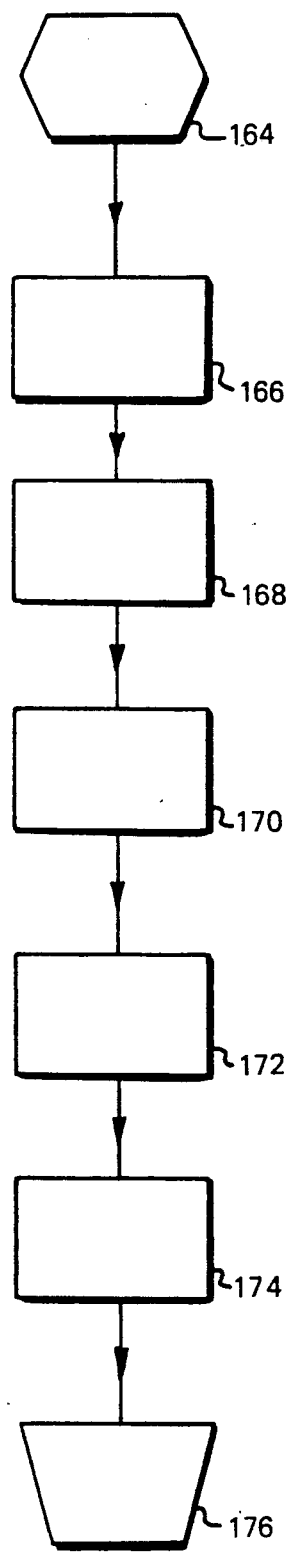

Referring to FIG. 9, phase 3 begins at block 164. The "vari-pulse" length is calculated at block 166 from the rate-of-change of driver's demand and the pulse timer is set up at block 168. The pulse amplitude is calculated at block 170 using the trailer mass (FIG. 12) and the output pulse is supplied (block 172) to the pressure output (conduit 46) to provide an output pressure set to a value proportional to trailer mass. The "pulse-active" flag is set (block 174) and control is passed via block 176 to phase 4.

Subsequent passes are routed to the "pulse-active" phases (4,5,6) (FIG. 10) which are called when the "pulse-active" flag is set and when the demand rate of change is above a predetermined threshold. Here there are three actions possible:

Phase 4—the pulse continues

Phase 5—If the demand rate-of-change falls below a predetermined threshold, the pulse is terminated Phase 6—If the timer times out, the pulse is terminated Referring to FIG. 10, phases 4, 5 and 6 begin at block 178. The pulse timer is decremented at block 180. If the pulse timer is not zero (block 182) and if the demand rate of change is below the predetermined threshold (block 184), then the program returns to block 178, via path 186. On the other hand, if it is determined at block 182 that the pulse timer is zero, then phase 5 proceeds on path 188 and if it is determined that, although, the pulse timer is not zero, the demand rate of change is above the predetermined threshold, then phase 6 proceeds on path 190. The output pressure is set to a normal value at block 192, the pulse timer is set to zero and block 194, the "pulse-active" flag is cleared at block 196 and the program proceeds to pass control to phase 7 via block 198.

Thus, after the pulse has been terminated, subsequent passes are routed to the "normal brake pressure" phase (phase 7) (FIG. 11). Here, normal brake pressure is generated, unless the demand rate-of-change exceeds a predetermined threshold. If this happens, an additional vari-pulse is initialised (phase 8).

Referring to FIG. 11, phase 7 and 8 begin at block 200. If the demand rate-of-change is detected to be below the predetermined threshold (block 202), then the normal control pressure is output (block 204) and the program returns to block 200 via path 206. If, however, the demand rate-of-change does exceed the predetermined threshold (block 202), then a pulse length is calculated from demand rate of change and the timer is set (block 208). The pulse amplitude is calculated (block 210) from the trailer mass (FIG. 12).

The pulse pressure is then output (block 212), the "pulse-active" flag is set (block 214) and control is returned to phase 4 via block 216.

Subsequent passes are then routed to the pulse-active states (phases 3, 4, 5) as described above, and the sequence repeats.

If at any time driver demand returns to zero, then control returns to phase 1.

We claim:

1. An electronic braking system (EBS) for a towing vehicle, having provision for a controlled braking pressure supply for a trailer vehicle having its own braking circuit, comprising:
   (a) a driver's braking demand transducer for producing an electrical signal representative of the braking demand level;
   (b) at least one pressure control channel adapted to be controlled by the driver's demand signal for controlling the extent of braking of the towing vehicle in proportion to the magnitude of said braking demand signal;
   (c) a separate EBS sub-system for providing controlled braking pressure to the braking circuit of the trailer; and
   (d) means in said EBS sub-system for the trailer for producing said electrical signal representing the driver's braking demand to generate a pressure speed-up pulse, at least a part of which is of preset fixed duration, which pulse is directed to the trailer to pressurize the trailer braking circuit in advance of the start to the proportional pressure control which follows the braking demand set by the driver.

2. An electronic braking system as claimed in claim 1, including means for measuring the rate of change of said driver's braking demand signal and wherein said pressure speed-up pulse is made up of two parts: said preset fixed duration part, followed without a break by a variable duration continuation part, the period of which is determined at least in part by the rate of increase of the driver's demand signal as determined by said rate of change measurement means.

3. An electronic braking system according to claim 2, including means by which the duration of said variable part of said pulse is caused to be terminated before the end of said determined period in the event that the prevailing rate of demand increase shows a substantial fall.

4. An electronic brake system according to claim 2, wherein the amplitude of the fixed duration part of said pulse and the following variable duration part of said pulse are preset before a braking phase is demanded by the driver, based on an assessed and stored figure for the trailer mass, such that a fully loaded trailer receives a maximum amplitude speed-up pulse and a trailer less than fully loaded receives a reduced amplitude speed-up pulse.

5. An electronic braking system according to claim 2, comprising first means for generating said preset fixed duration part of said pulse upon detection of the driver's demand signal and second means for generating said variable duration part of said pulse immediately after the termination of said preset fixed duration part, said second means controlling the duration of the variable duration part of the pulse in dependence upon the rate of change of the driver's demand as detected at said rate of change measurement means.

6. An electronic braking system according to claim 5, including means for calculating the mass of the trailer and for inputting a corresponding trailer mass signal to said first and second means to enable said pulse to be modified in dependence upon the trailer mass.

7. An electronic braking system (EBS) for a towing vehicle, having provisions for a controlled braking pressure supply for a trailer vehicle fitted with its own braking circuit, comprising:

(a) a driver's braking demand transducer for producing an electrical signal representative of the braking demand level;
(b) at least one pressure control demand adapted to be controlled by the driver's demand signal for controlling the extent of braking of the towing vehicle in proportion to the magnitude of said braking demand signal;
(c) a separate EBS sub-system for providing controlled braking pressures to the braking circuit at the trailer; and
(d) a means in said EBS sub-system for the trailer for processing said electrical signal representing the driver's braking demand to generate a pressure speed-up pulse which is directed to the trailer to pressurize the trailer braking circuit in advance of the start of the proportional control which follows the braking demand set by the driver, said pulse being made of two parts, a preset fixed duration part followed without a break by a variable duration part whose variable duration is determined in response to the rate of change of the driver's demand signal.

* * * * *